(12) United States Patent
Pritchard

(10) Patent No.: US 9,447,873 B2
(45) Date of Patent: Sep. 20, 2016

(54) MOTOR DRIVEN TRANSFER CASE WITH CONCENTRIC ACTUATION

(71) Applicant: BorgWarner Inc., Auburn Hills, MI (US)

(72) Inventor: Larry A. Pritchard, Macomb, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 104 days.

(21) Appl. No.: 14/561,740

(22) Filed: Dec. 5, 2014

(65) Prior Publication Data

US 2015/0159751 A1    Jun. 11, 2015

Related U.S. Application Data

(60) Provisional application No. 61/914,161, filed on Dec. 10, 2013.

(51) Int. Cl.
| | |
|---|---|
| *F16H 61/32* | (2006.01) |
| *B60K 17/344* | (2006.01) |
| *B60K 23/08* | (2006.01) |
| *B60K 17/346* | (2006.01) |

(52) U.S. Cl.
CPC .............. *F16H 61/32* (2013.01); *B60K 17/344* (2013.01); *B60K 17/3467* (2013.01); *B60K 23/0808* (2013.01); *F16H 2061/326* (2013.01); *Y10T 29/49464* (2015.01)

(58) Field of Classification Search
None
See application file for complete search history.

(56) References Cited

U.S. PATENT DOCUMENTS

| | | | |
|---|---|---|---|
| 4,664,217 | A | 5/1987 | Welch et al. |
| 5,597,369 | A | 1/1997 | Brissenden et al. |
| 5,699,870 | A | 12/1997 | Warren |
| 6,779,641 | B2 | 8/2004 | Vonnegut et al. |
| 6,780,134 | B2 | 8/2004 | Vonnegut et al. |
| 6,808,053 | B2 | 10/2004 | Kirkwood et al. |
| 6,814,682 | B2 | 11/2004 | Spitale |
| 6,945,375 | B2 | 9/2005 | Kirkwood et al. |
| 7,631,719 | B2 | 12/2009 | Wenthen |
| 7,650,808 | B2 | 1/2010 | Mizon et al. |

(Continued)

FOREIGN PATENT DOCUMENTS

| | | |
|---|---|---|
| EP | 187117 B1 | 4/1989 |
| EP | 741054 B1 | 7/2002 |

(Continued)

*Primary Examiner* — Ramya Burgess
*Assistant Examiner* — Timothy M Hannon
(74) *Attorney, Agent, or Firm* — Helmholdt Law PLC; Thomas D. Helmholdt

(57) ABSTRACT

A transfer case (30) and a method of assembly can include a range shifting assembly (60) and a clutch assembly (80) located axially adjacent to one another along a common primary axis. An actuating device (32) can include a concentric gear located coaxially interposed between the range shifting assembly (60) and the clutch assembly (80) for rotation about the common primary axis. The concentric gear (48) can actuate the range shifting assembly (60) during a portion of angular rotation about the common primary axis and can actuate the clutch assembly (80) during a mutually exclusive portion of angular rotation about the common primary axis. The actuating device (32) can include a barrel cam (59), a plurality of springs engageable between the barrel cam (59) and the concentric gear (48), and a shift fork (68) operably engageable with a cam surface groove (57) for guided axial movement to actuate the range shifting assembly (60) between a low-range and high-range drive mode.

15 Claims, 8 Drawing Sheets

(56) References Cited

U.S. PATENT DOCUMENTS

| | | |
|---|---|---|
| 2003/0211913 A1 | 11/2003 | Spitale |
| 2003/0224894 A1 | 12/2003 | Vonnegut et al. |
| 2007/0175286 A1* | 8/2007 | Oliveira ................. F16H 63/304 74/335 |
| 2008/0129230 A1 | 6/2008 | Schepperle et al. |
| 2009/0032352 A1* | 2/2009 | Pritchard ........... B60K 23/0808 192/3.52 |
| 2010/0107811 A1* | 5/2010 | McCloy ............. B60K 17/3467 74/665 F |

FOREIGN PATENT DOCUMENTS

| | | |
|---|---|---|
| GB | 878366 A | 9/1961 |
| JP | 2001213182 A | 8/2001 |
| JP | 2007050790 A | 3/2007 |
| JP | 2010076748 A | 4/2010 |
| WO | 2007092328 A2 | 8/2007 |

* cited by examiner

MOTOR DRIVEN TRANSFER CASE WITH CONCENTRIC ACTUATION

FIELD OF THE INVENTION

The invention relates to a mechanism for joint control of transmission and clutch or brake, and in particular, a power-transmitting device using friction or interlocking parts for securing and releasing driving continuity as between two shafts or a pulley and a shaft or other driving and driven parts including an actuating device that causes the power-transmitting device to transition into or out of a state in which it provides the driving continuity between the driving and driven parts.

BACKGROUND

Transfer cases are used in vehicular driveline applications for selectively directing drive torque from the powertrain to wheels of the vehicle, either four wheel drive or two wheel drive. Transfer cases have been previously disclosed in U.S. Pat. No. 7,650,808; U.S. Pat. No. 6,945,375; U.S. Pat. No. 6,814,682; U.S. Pat. No. 6,808,053; U.S. Pat. No. 6,780,134; U.S. Pat. No. 6,779,641; U.S. Pat. No. 5,699,870; U.S. Published Application No. 2003/0211913; U.S. Published Application No. 2003/0224894; and U.S. Published Application No. 2008/0129230. Current transfer cases are equipped with a mode shift mechanism that can be actuated to shift between different drive modes. Current transfer cases can also include a range shift mechanism which can be selectively actuated by a vehicle driver to engage a reduction gearset for shifting between high-range and low-range drive modes. In current transfer cases, the range shift mechanism and clutch assembly are independently controlled by separate power-operated actuators. Current transfer cases can, however, include a single power-operated actuator operable to coordinate the actuation of both the range shift mechanism and the clutch assembly. While transfer cases equipped with coordinated actuation systems have been commercially successful, a need exists to develop alternative actuation systems that are less complex and more economically feasible to produce. Some manufacturers use a single motor to perform both functions, while relying on a plethora of additional off axis components to accomplish this task. Specifically, worm gear drives, cams, barrel cams, gear reduction, shift shafts, range forks etc. to evoke actuating of both clutch and range. Current transfer cases require use of a plethora of components located off-axially to the primary axis to evoke actuating of a range shifting assembly or a clutch assembly. It would be desirable to provide a transfer case that uses fewer components to actuate both the range shifting assembly and the clutch assembly.

SUMMARY

To overcome the limitation of current technology, the motor driven transfer case with concentric actuation uses a simplified actuating device to actuate both the range shifting assembly and a clutch assembly located adjacently along a primary axis. The disclosed transfer case uses an off-axis electric motor to perform both clutch actuating and range shifting functions. The disclosed transfer case uses a simplified off axis gear train to rotate a gear which is mounted concentric to the clutch and range actuating axis. The range function is performed by rotating a barrel cam, through a plurality of springs. A shift fork can travel within a cam range of the barrel cam for shifting between a low-range and high-range drive mode. On either end of the cam range is a period of dwell in which the clutch is actuated through a plurality of pocket slots within the concentric gear which only engage at the dwell portion of the cam range to actuate the clutch assembly. The disclosed transfer case is an improvement over current products in that the gear drive is higher in efficiency and uses fewer components to affect the same actuating function as provided in current transfer cases.

A transfer case can include an input shaft having a primary axis of rotation, a first output shaft coaxially aligned with and rotatable about the primary axis, a second output shaft rotatable about a secondary axis parallel to the primary axis, and a power transmission device located between the first output shaft and the second output shaft. A range shifting assembly and a clutch assembly can be located coaxial with respect to the primary axis and axially adjacent to one another. The range shifting assembly can be operably connected between the input shaft and the first output shaft to axially shift between a low-range drive mode and a high-range drive mode of operation. The clutch assembly can be operably connected to the power transmission device to axially move between an engaged position and a disengaged position to transfer into or out of a state creating driving continuity for transferring drive torque between the first output shaft and the second output shaft. An actuating device can include a rotatable concentric gear mounted coaxial with respect to the primary axis and axially interposed between the range shifting assembly and the clutch assembly. The concentric gear can actuate the range shifting assembly during a portion of angular rotation about the primary axis and can actuate the clutch assembly during a mutually exclusive portion of angular rotation about the primary axis.

The actuating device can include a barrel cam. The barrel cam can include a cam surface groove extending circumferentially and axially along an interior surface of the barrel cam to define an axial range shift movement in response to rotation of the barrel cam, and a plurality of axially extending cam tabs operably engageable with a corresponding plurality of elongated barrel-cam-engaging arcuate slots defined by the concentric gear. The actuating device can include a plurality of arcuate springs extending along an angular portion of the concentric gear and engageable between the cam tabs of the barrel cam and the concentric gear for biasing the barrel cam to follow rotational movement of the concentric gear, if completion of range shift movement is temporarily blocked due to unmeshed gear teeth engagement during axial movement. The plurality of arcuate springs are constrained to follow movement of the concentric gear and can be compressed in either rotational direction of the concentric gear in response to failure of the barrel cam to follow rotational movement of the concentric gear. When compressed, the plurality of arcuate springs continually bias the barrel cam in the desired direction of movement until the range shift movement is completed. A shift fork can be operably engaged in a guided relationship with respect to the cam surface groove of the barrel cam. The shift fork can be driven to travel along the cam surface groove in an axial direction in response to rotation of the barrel cam by the concentric gear to actuate the range shift function between a low-range drive mode and a high range drive mode. The shift fork can be operably engageable with the barrel cam through a shift collar. Rotation of the rotatable concentric gear operably engages the clutch assembly and the range shifting assembly through interaction of the corresponding slots and tabs to rotate the barrel cam in predetermined angular orientations causing movement of the shift fork driving the internal range shift sleeve in axial movement between a low-range drive mode axial position and a high-range drive mode axial position for providing different drive ratios.

The actuating device can include a clutch actuator engageable with the concentric gear on a side opposite from the range shifting assembly. The clutch actuator can include a plurality of rolling members. The clutch actuator can define a plurality of arcuate recesses extending along angular portions of a flange or disk of the clutch actuator. Each arcuate recess can have tapering outer ends opposite from one another. The plurality of arcuate recesses are provided for receiving a corresponding plurality of rolling members, which can shift the clutch assembly between a first axial clutch position and a second axial clutch position in response to movement of the rolling members from a deep central portion of each arcuate recess to a shallow outer end of the corresponding arcuate recess in response to rotational movement of the concentric gear. The clutch actuator can include a plurality of axially extending tabs operably engageable with a corresponding plurality of elongated clutch-actuator-engaging arcuate slots formed in the concentric gear. An axially movable intermediate plate traps the rolling members within corresponding recesses of the clutch actuator. Rotation of the rotatable concentric gear operably engages the clutch assembly and the range shifting assembly through interaction of the corresponding slots and tabs to rotate the clutch actuator in predetermined angular orientations causing movement of the angular recesses driving the rolling members toward an outer end of the recesses resulting in axial movement of the pressure plate between an engaged position and a disengaged position relative to the clutch pack.

A method for assembling a transfer case can be provided, where the transfer case can include an input shaft having a primary axis of rotation, a first output shaft coaxially aligned with and rotatable about the primary axis, a second output shaft rotatable about a secondary axis parallel to the primary axis, and a power transmission device located between the first output shaft and the second output shaft. The method can include positioning a range shifting assembly and a clutch assembly coaxial with respect to one another and axially adjacent to one another along the primary axis. The range shifting assembly can be operably connected between the input shaft and the first output shaft to axially shift between a low-range drive mode and a high-range drive mode of operation. The clutch assembly can be operably connected to the power transmission device to axially move between an engaged position and a disengaged position to transfer into or out of a state creating driving continuity for transferring drive torque between the first output shaft and the second output shaft. The method can include interposing a concentric gear of an actuating device axially between the range shifting assembly and the clutch assembly for rotation with respect to the primary axis. The concentric gear can be rotatable around the primary axis and operably engageable with the range shifting assembly and the clutch assembly for actuating the range shifting assembly during a portion of angular rotation about the primary axis and for actuating the clutch assembly during a mutually exclusive portion of angular rotation about the primary axis.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
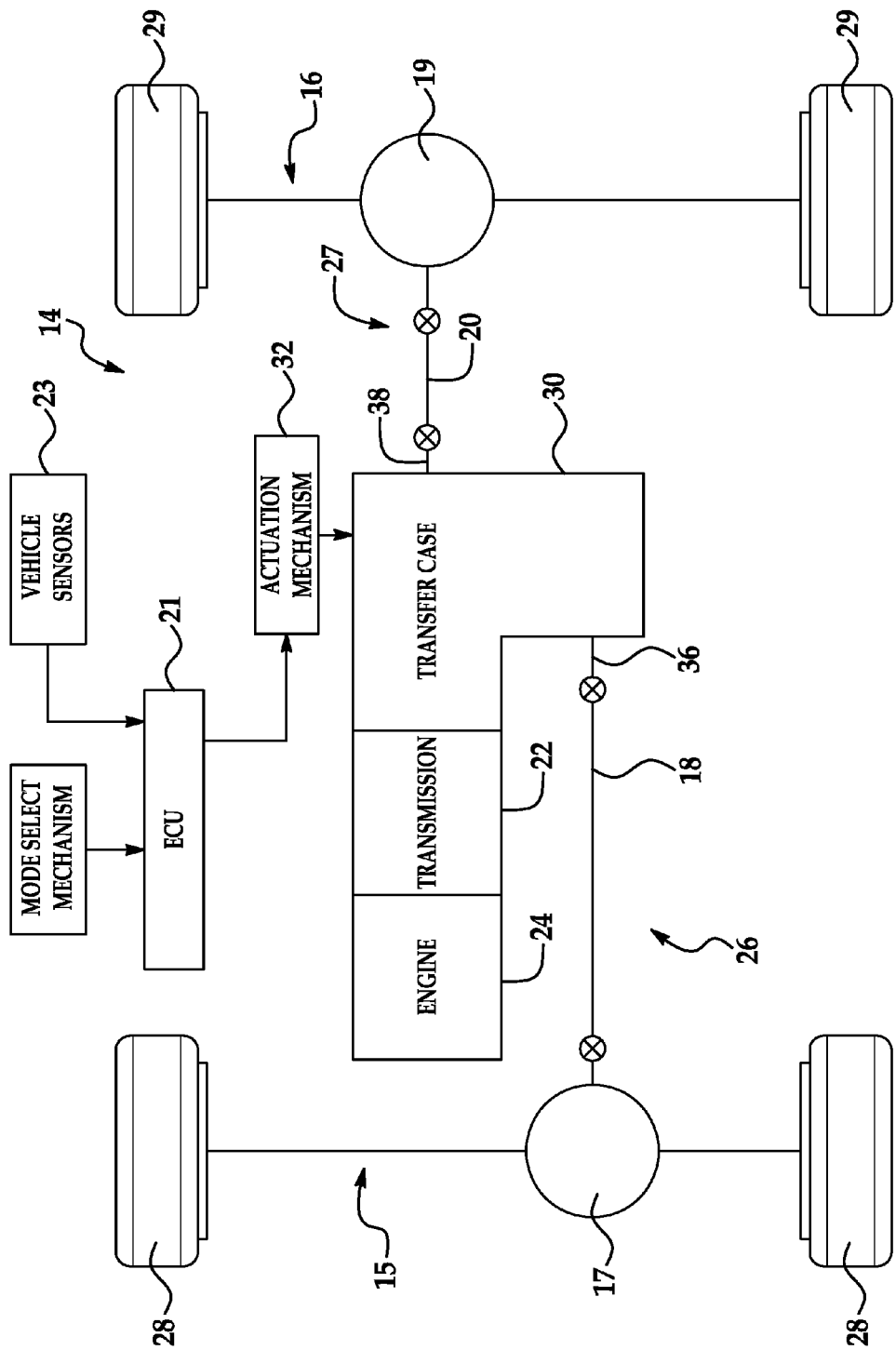
FIG. 1 is a schematic view of a four-wheel drive vehicle equipped with a transfer case according to the present invention.

Referring now to FIG. 1, a vehicle 14 can include an internal combustion engine 24 and power transmission device 22 for generating and delivering drive torque to a front driveline 26 and a rear driveline 27. The vehicle 14 can further include a transfer case 30 for transmitting drive torque from the internal combustion engine 24 and the power transmission device 22 to the front driveline 26 and the rear driveline 27. The front driveline 26 can include a pair of front wheels 28 connected at distally opposite ends of a front axle assembly 15 including a front differential 17 that can be coupled to one end of a front driveshaft 18. The opposite end of the front driveshaft 18 can be coupled to a first output shaft 36 of the transfer case 30. The first output shaft 36 can drive the front drive shaft 18, and the front differential 17 can transfer the drive energy to the pair of front wheels 28 through the front axle assembly 15. The rear driveline 27 can include a pair of rear wheels 29 connected at distally opposite ends of a rear axle assembly 16 including a rear differential 19 that can be coupled to one end of a rear driveshaft 20. The opposite end of the rear driveshaft 20 can be coupled to a second output shaft 38 of the transfer case 30. The transfer case 30 can provide output power to the second output shaft 38 which provides rotational energy to the rear driveshaft 20. This rotational energy can be transferred through the rear differential 19 and the rear axle assembly 16 to the pair of rear wheels 29. The transfer case 30 can be equipped with a range shifting assembly 60, a clutch assembly 80, and an actuating device 32 for actuating the range shifting function of the range shifting assembly 60 and actuating the mode shifting function of the clutch assembly 80. A control system 21 can be provided for controlling actuation of the actuating device 32. The control system 21 can include vehicle sensors 23 for detecting the operations of a driver in a vehicle 14. The control system 21 can operate in an automatic mode automatically controlling the actuating device 32, or can provide for the driver to select one of the available drive modes and ranges in a manual mode of operation. In either case, the control system 21 can provide for control signals being sent to the transfer case 30 to cause the transfer case 30 to make the shift to the desired drive mode or range.

Figure 2:
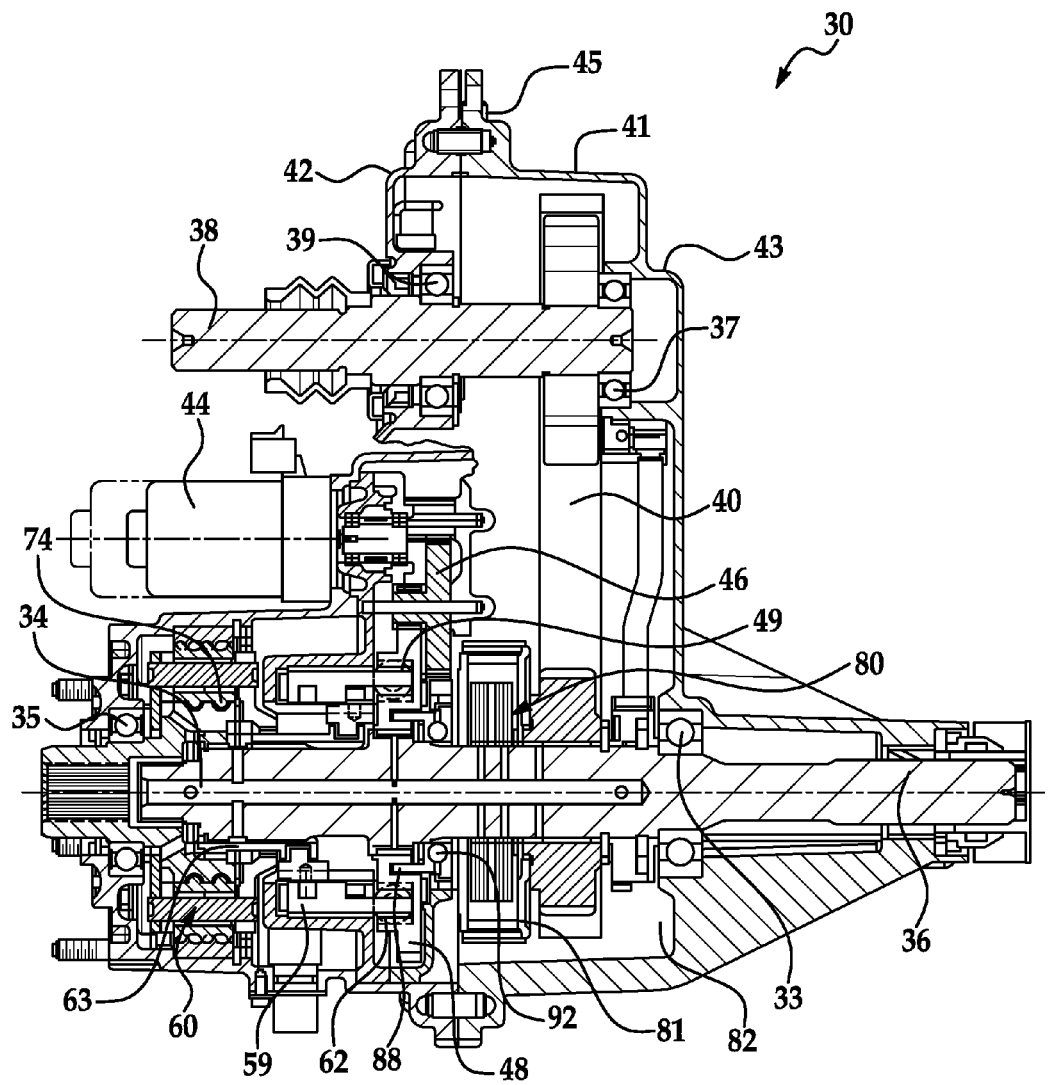
FIG. 2 is a sectional view of a transfer case according to the present invention.

Referring now to FIGS. 2-8B, an improvement of a transfer case 30 is shown to include an input shaft 34 adapted to be driven by a power transmission device 22. As illustrated in FIG. 2, a drive shaft can be rotated by the internal combustion engine 24 and can be coupled to a power transmission device 22 that converts the output power from the internal combustion engine 24 to a geared output drive power. The output drive power from the power transmission device 22 can be transmitted to the input shaft 34 of the transfer case 30. The transfer case 30 can selectively transmit output drive power to a pair of rear wheels 29 and a pair of front wheels 28. The transfer case 30 can include a housing 41, a range shifting assembly 60, a clutch assembly 80, and an actuating device 32 operable to control coordinated shifting of the range shifting assembly 60 and adaptive engagement of the clutch assembly 80. The housing 41 can encompass a first output shaft 36 and a second output shaft 38. The housing 41 of the transfer case 30 can include a first half 42 and a second half 43 of housing 41 secured together with bolts 45. The housing 41 can include various seals, recesses, shoulders, flanges, bores, etc. that accept and position the various components and parts of the transfer case 30 discussed herein. The input shaft 34 can be rotably coupled within the housing 41 on ball bearings 35 and can be coupled to one end of the second output shaft 38 by roller bearings 37. The second output shaft 38 can be rotably mounted on ball bearings 39 at the distally opposite end from the input shaft 34. The first output shaft 36 can be rotably mounted within the housing 41 on ball bearings 33. The input shaft 34, the first output shaft 36, and the second output shaft 38 can extend from the housing 41 of the transfer case 30. As shown in FIG. 2, a power transmission member 40 can transfer torque from the input shaft 34 to the second output shaft 38. The power transmission member 40 can be a belt, a chain, gear train, or any other suitable method of power transmission coupling between shaft 36 and shaft 38.

Figure 6:
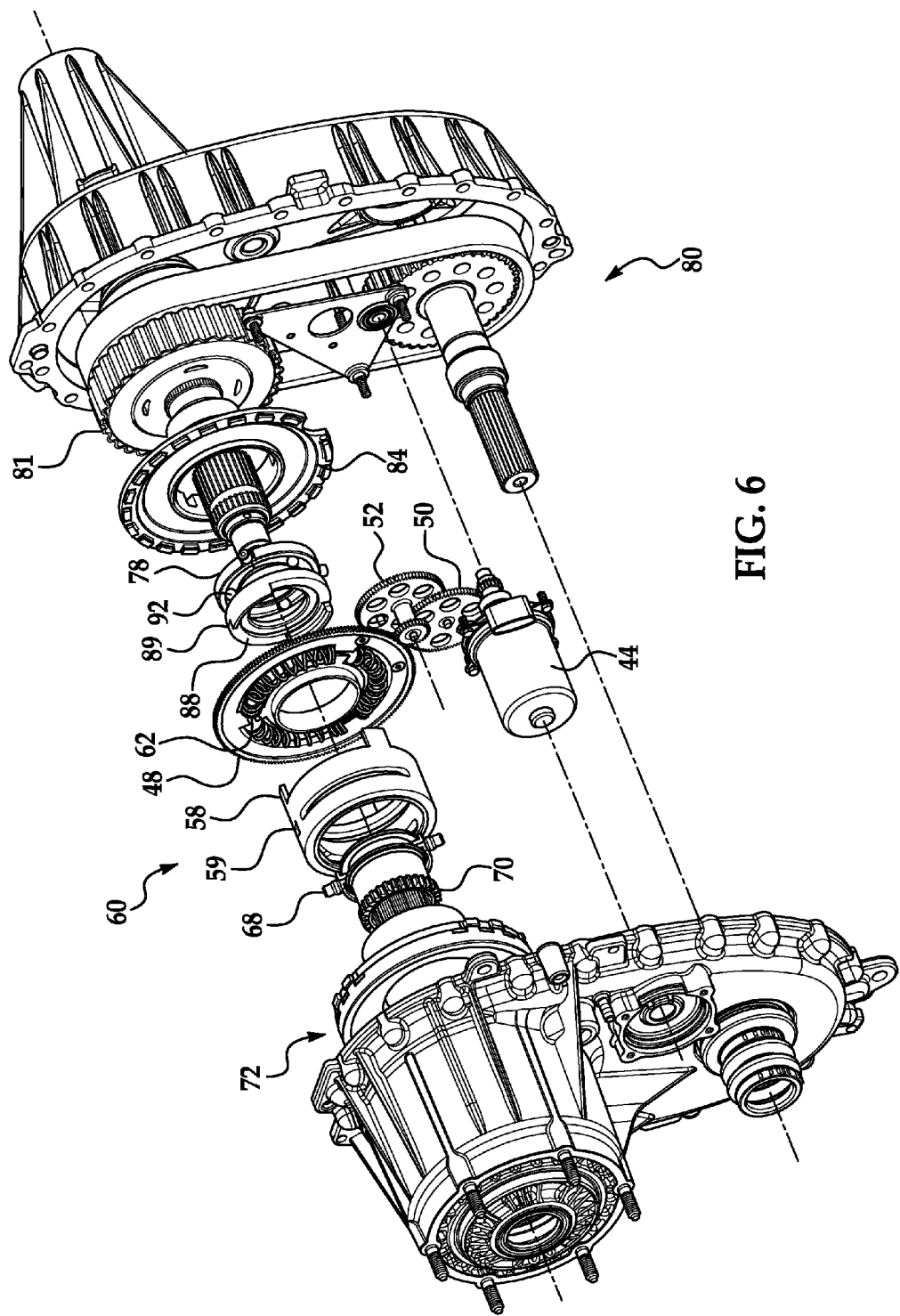
FIG. 6 is an enlarged view of the range shifting assembly and the clutch assembly located adjacent to one another along a common primary axis.
Figure 7:
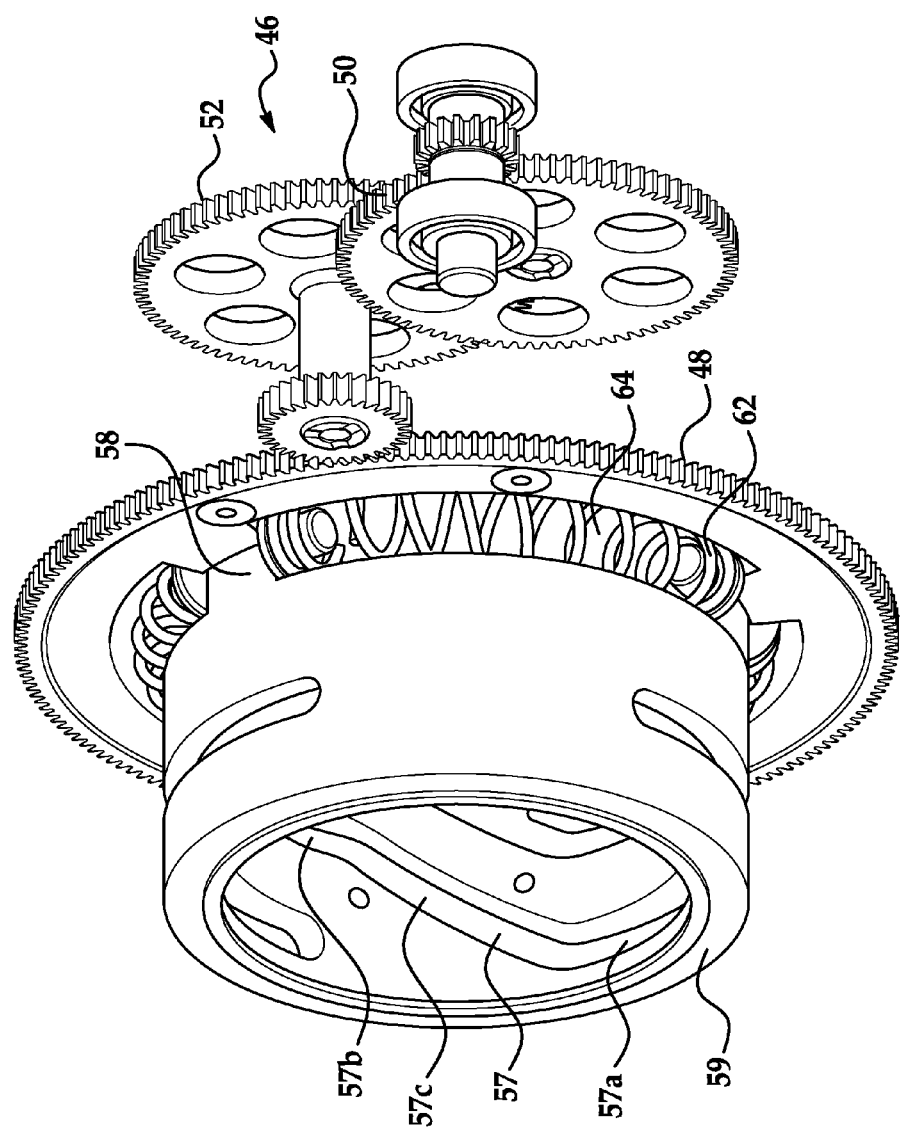
FIG. 7 is an enlarged partial view of the actuating device showing the concentric gear and the barrel cam in greater detail.
Figure 8B:
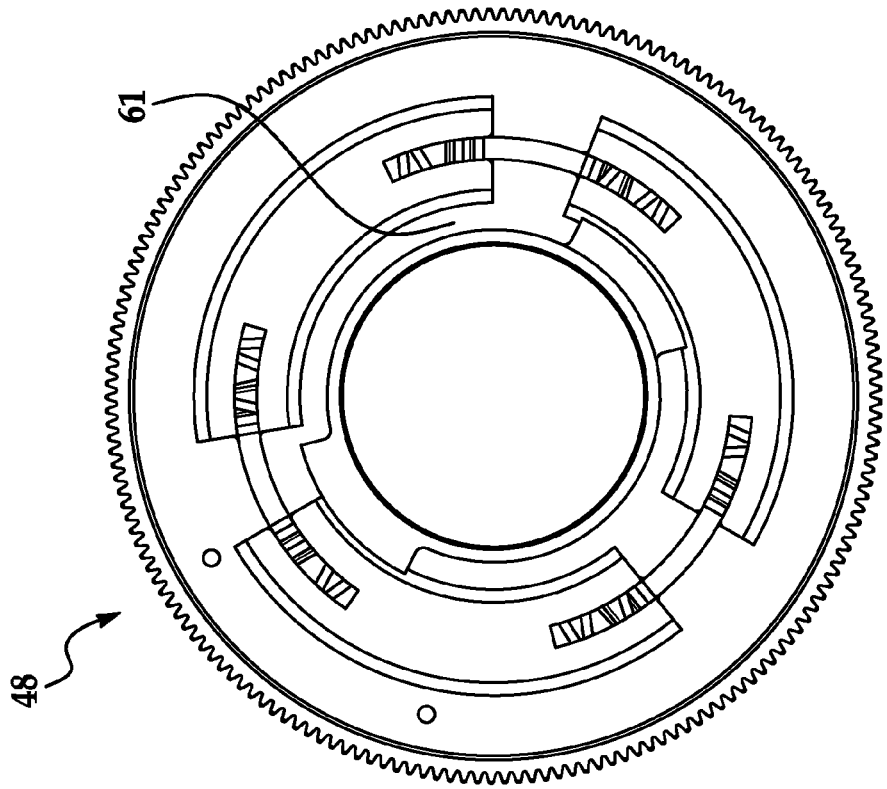
FIG. 8B is a schematic showing the clutch assembly actuating side of the concentric gear.
Figure 8A:
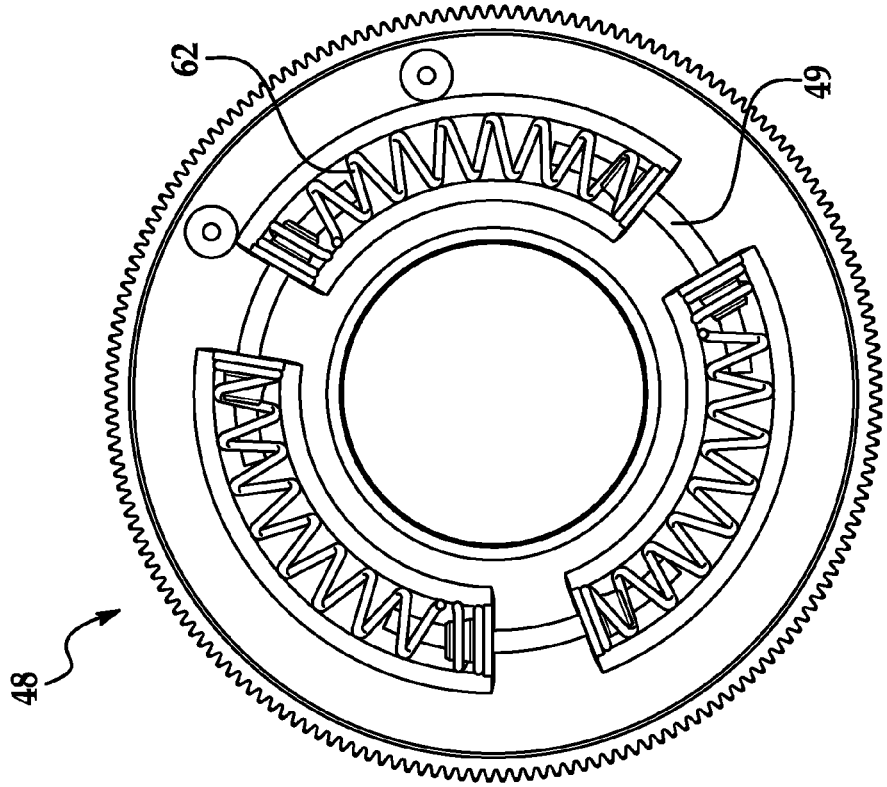
FIG. 8A is a schematic showing the range shifting assembly actuating side of the concentric gear.

As illustrated in FIGS. 2 and 6, the input shaft 34 can be rotatable around a common primary axis of rotation. The range shifting assembly 60 and the clutch assembly 80 can be located along the common primary axis and adjacent to one another. This configuration provides for the use of fewer off-axis components in performing the shifting functions of the range shifting assembly 60 and the clutch assembly 80. An actuating device 32 within the transfer case 30 can include a concentric gear 48 located coaxial with the common primary axis and interposed between the range shifting assembly 60 and clutch assembly 80, such that one face of the concentric gear 48 operatively engages and operates the range shifting assembly 60 during a portion of angular rotation about the common primary axis, while the opposite face of the concentric gear 48 operatively engages and operates the clutch assembly 80 during a mutually exclusive portion of angular rotation about the common primary axis. An electric motor 44 can be located off-axis with respect to the common primary axis for driving the concentric gear 48 in rotation about the common primary axis. The actuating device 32 can include a gear train 46 for transferring the drive torque from the electric motor 44 to the range shifting assembly 60 and the clutch assembly 80. The gear train 46 can include a plurality of gears. One of the plurality of gears can be a concentric gear 48 rotatable around the common primary axis and located between the range shifting assembly 60 and the clutch assembly 80. As best illustrated in FIGS. 7 and 8A, the concentric gear 48 can define a plurality of elongated barrel-cam-engaging arcuate slots 49 for engagement with a plurality of cam tabs 58 located on a barrel cam 59. The concentric gear 48 can further define a spring recess 64 located between each of the plurality of slots 49 for receiving a plurality of springs 62. As best illustrated in FIG. 7, the plurality of springs 62 can be engageable with the barrel cam 59 for actuation of the range shifting assembly 60. As best illustrated in FIG. 7, the barrel cam 59 can include a cam surface groove 57 extending circumferentially and axially along an interior surface of the barrel cam 59 to define an axial range shift movement in response to rotation of the barrel cam 59, and a plurality of axially extending cam tabs 58 operably engageable with a corresponding plurality of elongated barrel-cam-engaging arcuate slots 49 defined by the concentric gear 48. The actuating device 32 can include a plurality of arcuate springs 62 extending along an angular portion of the concentric gear 48 and engageable between the cam tabs 58 of the barrel cam 59 and the concentric gear 48 for biasing the barrel cam 59 to follow rotational movement of the concentric gear 48, if completion of range shift movement is temporarily blocked due to unmeshed gear teeth engagement during axial movement. The plurality of arcuate springs 62 are constrained to follow movement of the concentric gear 48 and can be compressed in either rotational direction of the concentric gear 48 in response to failure of the barrel cam 59 to follow rotational movement of the concentric gear 48. When compressed, the plurality of arcuate springs 62 continually bias the barrel cam 59 in the desired direction of movement until the range shift movement is completed. A shift fork 68 can be driven to move in guided travel along the cam surface groove in an axial direction in response to rotation of the barrel cam 59 by the concentric gear 48 to actuate the range shift function between a low-range drive mode and a high range drive mode of operation. The shift fork 68 can be operably engageable with the barrel cam 59 through a shift collar 70. In other words, the barrel cam 59 can be fixed to the concentric gear 48 when the plurality of cam tabs 58 are engaged within the plurality of barrel-cam engaging slots 49. The barrel cam 59 can be rotatably biased by the plurality of springs 62 even if axial movement is temporarily blocked, while the concentric gear 48 continues to rotate. When the barrel cam 59 is axially blocked during rotation, the plurality of springs 62 can loaded with rotational energy to bias the barrel cam 59 to move into a desired orientation. The plurality of springs 62 can provide a coupling between the concentric gear 48 and the barrel cam 59. The plurality of springs 62 can store energy between the electric motor 44 and the shift fork 68 until the desired range mode shift is completed.

Figure 3:
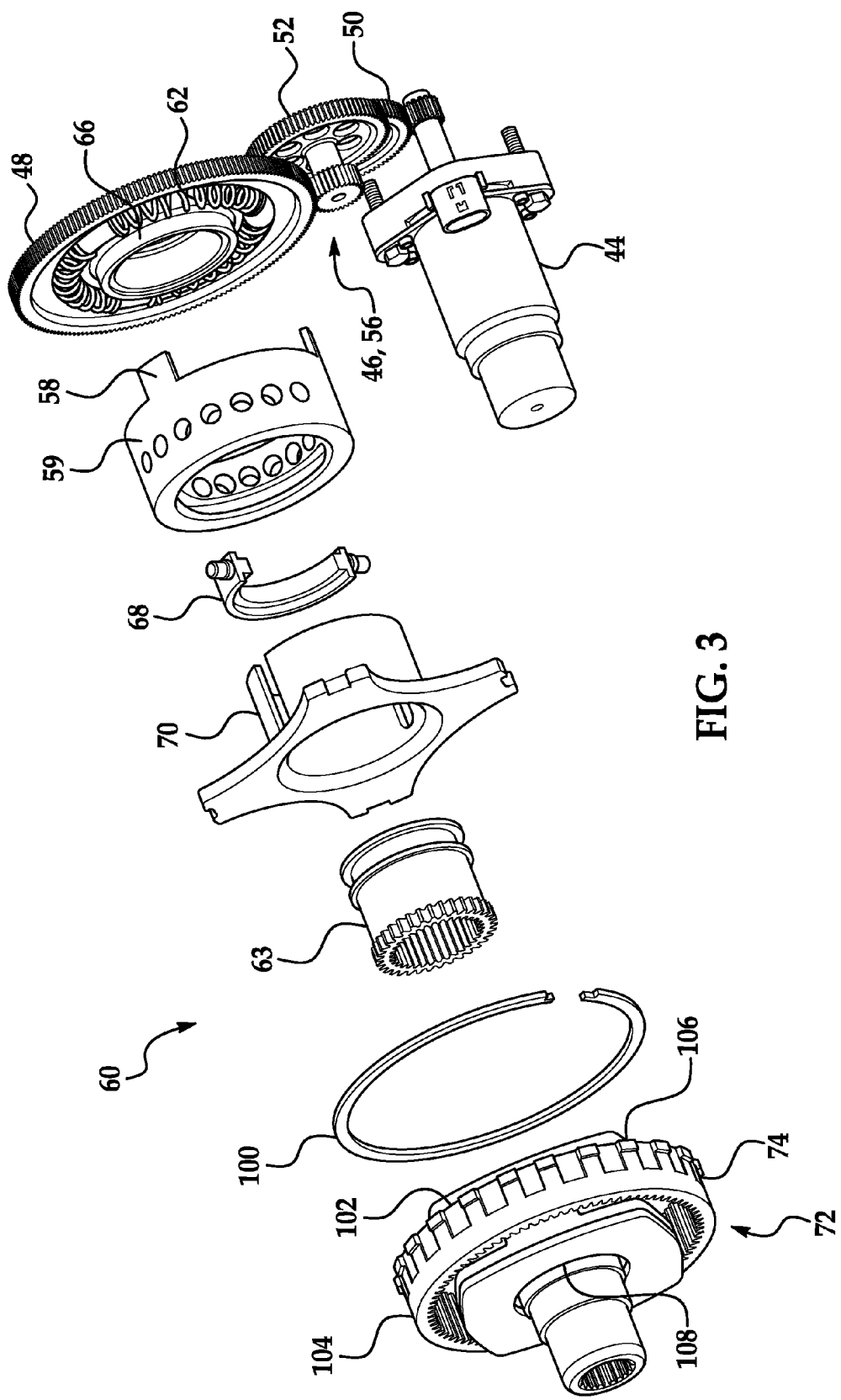
FIG. 3 is an exploded view of a range shifting assembly portion of the transfer case of FIG. 2.

As illustrated in FIGS. 2, 3, and 6, the actuating device 32 can actuate the range shifting assembly 60 through a face of the concentric gear 48 facing the range shift assembly 60. As best illustrated in FIG. 3, the gear train 46 can include an input gear 50 driven by the electric motor 44. The gear train 46 can further include an intermediate output gear 52. The input gear 50 can rotate the intermediate output gear 52. The intermediate output gear 52 can rotate the concentric gear 48. The actuating device 32 can include a barrel cam 59 having a cam surface groove 57 extending circumferentially and axially along an interior surface of the barrel cam 59 to define an axial range shift movement in response to rotation of the barrel cam 59, and a plurality of axially extending cam tabs 58 operably engageable with a corresponding plurality of elongated barrel-cam-engaging arcuate slots 49 defined by the concentric gear 48. A shift fork 68 can travel along the cam surface groove 57 to shift the range shifting assembly 60 between a low-range drive mode position and a high-range drive mode position. The barrel cam 59 can be rotatable around the common primary axis in response to rotation of the concentric gear 48. The actuating device 32 can further include a shift collar 70 that can be engageable with the shift fork 68 during the travel of the shift fork 68 within the cam surface groove 57 of the barrel cam 59. The shift fork 68 can act as a cam follower traveling within the cam surface groove 57 of the barrel cam 59. The shift fork 68, barrel cam 59, and shift collar 70 can surround an axially moveable internal range sleeve 63. The shift collar 70 is a cylindrical element that can be coupled to the shift fork 68 to allow axial movement of the shift fork 68, while preventing rotational movement of the shift fork 68. The shift collar 70 allows the shift fork 69 to slide in an axial direction to drive the internal range sleeve 63 in response to shifting rotational movement of the barrel cam 59 between a low-range angular position and a high-range angular position. The internal range sleeve 63 can be engageable between the actuating device 32 and a differential assembly 72, and transfers rotation from the differential assembly 72 to the output shaft 36 through a splined connection allowing axial movement of the internal range sleeve 63 with respect to the output shaft 36. The differential assembly 72 can vary the drive power between the input shaft 34 and the output shafts 36, 38.

When the control system 21 shifts the vehicle 14 into a high-range drive mode, the control system 21 can send a control signal to the transfer case 30. The concentric gear 48 can be rotated by the electric motor 44 within the transfer case 30. The barrel cam 59 can be rotated by engagement with the concentric gear 48 through the plurality of slots 49. In response to rotation of the barrel cam 59, the shift fork 68 is driven to travel in an axial direction following the cam surface groove 57 of the barrel cam 59. The shift fork 68 axially slides the internal range sleeve 63 of the range shifting assembly 60 between a high-range drive mode position and a low-range drive mode position. The barrel cam 59 can include a plurality of cam tabs 58 for engagement with the plurality of slots 49 defined by the concentric gear 48. When the shift fork 68 moves into a high-range mode of operation portion of the cam surface groove 57, the shift fork 68 slides axially along a groove formed in the shift collar 70 from a first position toward a second position located axially away from the concentric gear 48 in a direction toward the input shaft 34. In the high-range drive mode, the first output shaft 36 can rotate at a uniform speed with the input shaft 34. The input shaft 34 and the first output shaft 36 can rotate at a one to one (1:1) ratio. As best illustrated in FIG. 3, the range shifting assembly 60 can include a differential assembly 72 allowing for shifting between a low-range drive mode and high-range drive mode. When the control system 21 shifts the vehicle 14 into a low-range drive mode, the barrel cam 59 can be rotated by the concentric gear 48, such that the shift fork 68 moves into a low-range mode of operation portion of the cam surface groove 57. When the shift fork 68 moves into a low-range mode of operation portion of the cam surface groove 57, the shift fork 69 slides along the groove formed in the shift collar 70 driving the internal range sleeve 63 into engagement with a planetary gear carrier 106 of the differential assembly 72 to provide a drive ratio of less than one to one. When the range shifting assembly 60 is in a low-range drive mode, the input shaft 34 can provide a different drive ratio to the first output shaft 36 and the second output shaft 38.

When in the high-range mode of operation, the barrel cam 59 slides the shift fork 68 along the groove formed in the shift collar 70 to drive the internal range sleeve 63 for engagement with a sun gear 108 of the differential assembly 72 for a direct drive configuration.

Figure 5:
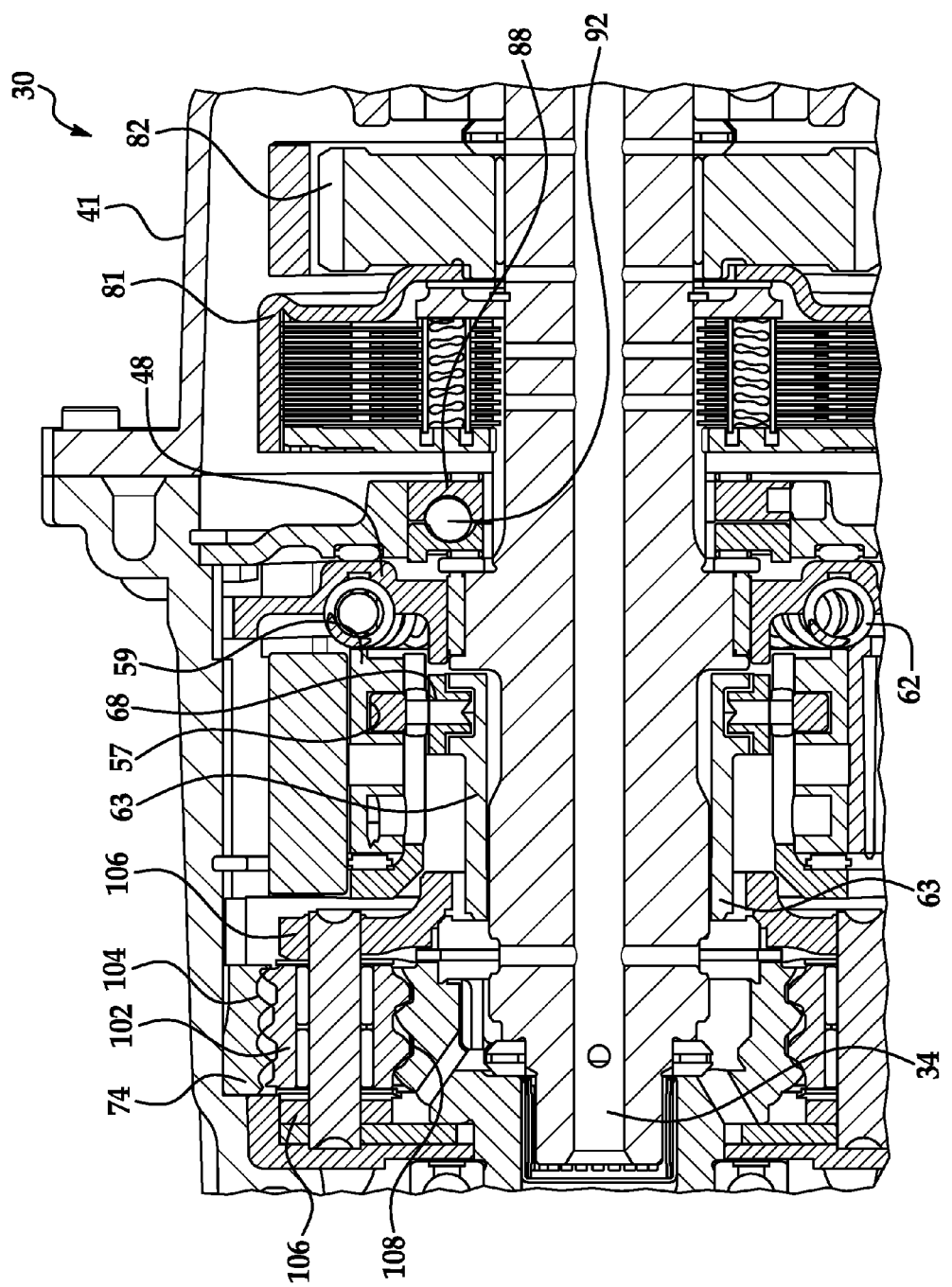
FIG. 5 is an enlarged detailed view of the transfer case of FIG. 2 showing the range shifting assembly and clutch assembly in greater detail.

As best illustrated in FIG. 3, the differential assembly 72 can include a snap ring 100 and a planetary gear assembly 74. The planetary gear assembly 74 can include a plurality of planetary gears 102, ring gear 104, a planetary gear carrier 106, and a sun gear 108. When the shift fork 68 is driven into a low-range drive mode portion of the cam surface groove 57, the internal range sleeve 63 can axially move to couple the output shaft 36 with the planetary gear carrier 106 as best seen in FIG. 5. When the shift fork 68 is driven into the high-range drive mode portion of the cam surface groove 57, the internal range sleeve 63 can axially move to couple the output shaft 36 with the sun gear 108. As best seen in FIG. 5, the gear teeth of the internal range sleeve 63 can engage with the internal teeth of the sun gear 108 when shifted to the left from the position illustrated in FIG. 5. The snap ring 100 can be non-rotatable and can secure the differential assembly 72 within the housing 41. The sun gear 108 can be driven by the input shaft 34. The plurality of planetary gears 102 can be rotatable around the sun gear 108. The planetary gear assembly 74 can include a planetary gear carrier 106. Drive torque can be transferred to the output shaft 36 directly from the sun gear 108 or indirectly through the planetary gear carrier 106 depending on the drive ratio desired. The gearing ratio between the sun gear 108 and the plurality of planetary gears 102 can be a reduction ratio, rotating the first output shaft 36 at a different speed in comparison to the rotation speed of the input shaft 34. A preferred reduction ratio can include a range of 3:1 to 10:1. The preferred ratio can be around 6:1. It should be recognized by those skilled in the art, that other differential assembly designs other than the one illustrated can be employed in the transfer case 30 without departing from the spirit or scope of the present invention. Any range shifting assembly 60 having an axially movable member driven by a concentric gear coaxially interposed between the range shift assembly 60 and clutch actuator assembly 80 through a barrel cam to establish first and second drive ratio connections is considered to be within the scope of the present invention.

Figure 4:
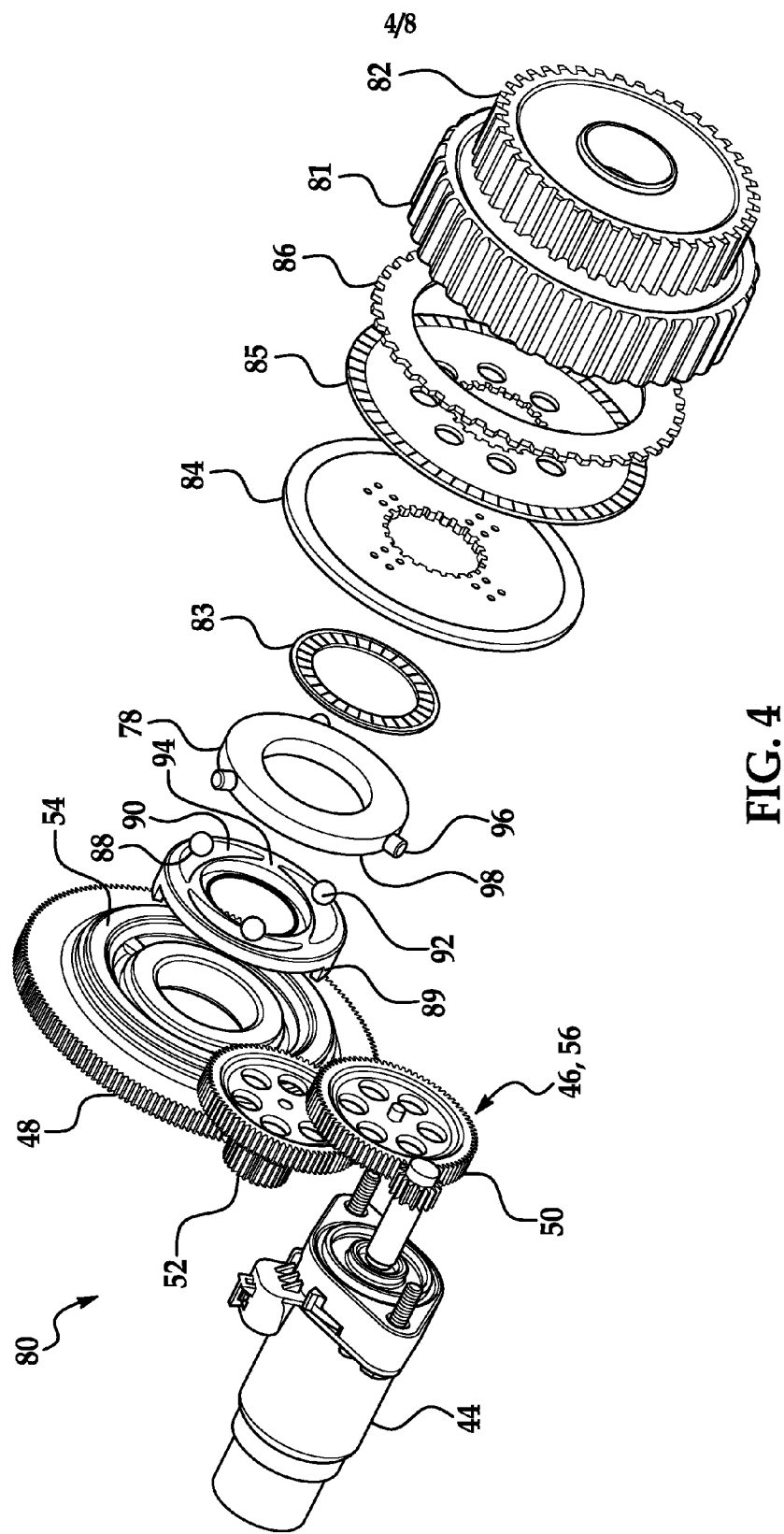
FIG. 4 is an exploded view of a clutch assembly portion of the transfer case of FIG. 2.

As illustrated in FIGS. 2, 4, and 6, the actuating device 32 can also actuate the clutch assembly 80 through a face of the concentric gear 48 opposite from the range shifting assembly 60. As best illustrated in FIG. 4, the gear train 46 can include an input gear 50 driven by the electric motor 44 within the transfer case 30. The gear train 46 can further include an intermediate output gear 52. The input gear 50 can rotate the intermediate output gear 52 which can engage the input gear 50 and the concentric gear 48. The intermediate output gear 52 can rotate the concentric gear 48. As best illustrated in FIG. 8B, the actuating device 32 can actuate the clutch assembly 80 through a plurality of elongated arcuate pocket slots 61 defined by the concentric gear 48. The plurality of elongated arcuate pockets slots 61 can be located adjacent to and radially spaced inwardly from, while being angularly overlapping with respect to, the plurality of elongated barrel-cam-engaging arcuate slots 49 on the opposite side of the concentric gear 48 as best seen comparing FIGS. 8A-8B. The plurality of elongated arcuate pocket slots 61 are located on the face of the concentric gear 48 opposite from the face engaged with the plurality of springs 62. The plurality of elongated arcuate pocket slots 61 can be located adjacent to and radially spaced inwardly from, while being angular overlapping with respect to the spring recesses 64 on the opposite face of the concentric gear 48. The cam surface groove 57 of the barrel cam 59 can include a period of dwell 57a, 57b on either end of the axial travel of the shift fork 68 within the cam surface groove 57 as best seen in FIG. 7. When the shift fork 68 is in the period of dwell, the shift fork 68, acting as a cam follower, is axially stationary even though the barrel cam 59 can be rotating in response to rotation of the concentric gear 48. When the shift fork 68 is in the range shift portion 57c of the cam surface groove 57 and rotation of the barrel cam 59 is blocked due to axial movement of the internal range sleeve 63 being blocked until proper intermeshing teeth alignment is achieved to complete the requested range mode shift, the plurality of springs 62 can act to receive the load allowing the concentric gear 48 to continue to rotate. When the shift fork 68 is in the period of dwell 57a, 57b, the clutch assembly 80 can be actuated through the plurality of elongated arcuate pocket slots 61, which can only operate the clutch assembly 80 when the shift fork 68 is in the dwell period 57a, 57b of the cam surface groove 57.

The actuating device 32 can further include a clutch actuator 88 located on a side of the concentric gear 48 opposite from the range shifting assembly 60. The clutch actuator 88 can include a plurality of clutch-actuating tabs 89 for engagement within the plurality of elongated arcuate pocket slots 61. When the shift fork 68 is in a period of dwell 57a, 57b of the cam surface groove 57, while in either a high-range drive mode or a low-range drive mode, the plurality of clutch-actuating tabs 89 are engaged within the plurality of elongated arcuate pocket slots 61 for actuating the components of the clutch assembly 80 in response to rotational movement of the concentric gear 48. The clutch actuator 88 can be located radially and axially within an annular ridge or ring 54. The annular ridge or ring 54 defines an annular housing for supporting and encloses the plurality of springs 62 on the opposite face of the concentric gear 48. The clutch actuator 88 can define a plurality of elongate arcuate recesses 90 having a deep central portion tapering to shallow outer ends 94. The plurality of elongate arcuate recesses 90 can receive a corresponding plurality of rolling members 92 with one rolling member 92 per recess 90. An intermediate plate 78 can be positioned to trap the plurality of rolling members 92 interposed between the clutch actuator 88 and the intermediate plate 78. The intermediate plate 78 can be axially moveable along the common primary axis in response to movement of the rolling member 92 along the corresponding elongated arcuate recess toward one of the tapered outer ends causing a distance between the clutch actuator 88 and the intermediate plate 78 to increase. The intermediate plate 78 can include a plurality of pins 96 located on an exterior peripheral surface portion 98 of the intermediate plate 78. The plurality of pins 96 can be engageable within the annular ridge or ring 54 of the concentric gear 48 to allow axial shifting movement of the intermediate plate 78 with respect to the concentric gear 48, and providing free floating support for the intermediate plate 78 while preventing transfer of rotational movement from the concentric gear to the intermediate plate 78. The actuating device 32 can also include a plurality of rolling members 92 to be received within the elongated arcuate recess 90 of the clutch actuator 88. The plurality of rolling members 92 can be located within corresponding elongated arcuate recesses for operable engagement with the intermediate plate 78. In response to rotational movement of the concentric gear 48, each of the plurality of rolling members 92 slide or roll to an outer shallower end portion 94 of the corresponding elongated arcuate recess 90 causing axial movement of the intermediate plate 78 away from the concentric gear 48 and toward a drive gear 82. When the range shifting assembly 60 is in either a low-range drive mode or a high-range of drive mode and the clutch assembly 80 is actuated, the concentric gear 48 can rotate such that the plurality of rolling members 92 can move within the tapering recess 90 of the clutch actuator 88 to actuate the clutch assembly 80. Depending on the clutch assembly design, the clutch actuator can operate to drive the pressure plate 84 between first and second axial positions to apply and release the clutch as the rolling members 92 move between the deeper central portion of the recesses 90 and the outer tapering shallower end portions 94 of the recesses 90.

As best illustrated in FIG. 4, the clutch assembly 80 can further include a ring member 83, a pressure plate 84, a diaphragm spring 85, a clutch friction disc 86, a clutch housing 81, and a drive gear 82. The drive gear 82 can be rotatable around the primary axis and can drive the second output shaft 38. The pressure plate 84 can be located along the common primary axis to be fixed for rotation with respect to the drive gear, while being axially moveable with respect to the drive gear 82. The pressure plate 84 can be axially moveable between a first clutch position and a second clutch position. When the plurality of rolling members 92 are located within the deeper central portion of the recesses 90 of the clutch actuator 88, the pressure plate 84 can be located in a second position or released position to disengage the drive gear 82 causing no drive torque to be transferred through the clutch assembly 80 to the second output shaft 38. When the plurality of rolling members 92 are positioned in an elevated shallower outer end portion 94 of the tapering recesses 90, the intermediate plate 78 is moved axially to exert force on the ring member 83 which can engage and force the pressure plate 84 into first axial position or locked position with the clutch friction disc 86 in order to transfer drive torque to the second output shaft 38. In the first position, a maximum clutch engagement force can be applied to the clutch assembly 80 such that the first output shaft 36 is coupled for uniform rotation with the second output shaft 38 to establish a non-differentiated drive mode. The diaphragm spring 85 and clutch friction disc 86 can be located along the common primary axis for axial movement in response to axial movement of the pressure plate 84. It should be recognized by those skilled in the art, that variations in assembling a multiple plate clutch assembly including a clutch friction disc 86, diaphragm spring 85 and pressure plate 84 are contemplated to be within the spirit and scope of the present invention. Any clutch actuator assembly 80 having an axially movable pressure plate driven axially by a concentric gear interposed coaxially between a range shift assembly 60 and clutch actuator assembly 80 through a clutch actuator to establish power transmission between first and second output shafts connections is considered to be within the scope of the present invention.

A method for assembling can include assembling an actuating device 32, a range shifting assembly 60, and a clutch assembly 80 coaxially along a common primary rotational axis within a housing 41 of a transfer case 30. An electric motor 44 can be mounted off-axis to act through a gear train 46 to drive a concentric gear 48 rotatable around the common primary axis. The concentric gear 48 can be assembled to be interposed between the range shifting assembly 60 and the clutch assembly 80. Rotation of the concentric gear 48 about the common primary axis by the electric motor 44 and the gear train 46 can actuate the range shifting assembly 60 and the clutch assembly 80. The actuating device 32 can include a barrel cam 59 mounted to be operably engageable with one side of the concentric gear 48 with a spring biased connection to allow rotation in response to rotation of the concentric gear 48, while allowing continued rotation of the concentric gear 48 when rotation of the barrel cam 59 is blocked due to temporary misalignment of intermeshing teeth of the range shift assembly. Biasing springs 62 can be mounted with a spring recess 64 of the concentric gear 48. Rotational energy can be absorbed by the plurality of springs 62 in order to continually apply a rotational force to bias the barrel cam 59 toward a desired position when alignment of the intermeshing teeth of the range shift assembly is achieved and further rotation of the barrel cam becomes possible. The method can include inserting a plurality of cam tabs 58 associated with the barrel cam 59 into operable engagement within elongated arcuate slots 49 formed in the concentric gear 48.

The method can further include positioning a plurality of clutch-actuating tabs 89 of the clutch assembly 80 into operable engagement within a corresponding plurality of elongated arcuate pocket slots 61 formed in the concentric gear 48 for actuating the clutch assembly in response to rotation of the concentric gear 48. The components of the range shifting assembly 60 to be assembled can include a plurality of springs 62, a barrel cam 59, a shift fork 68, a shift collar 70, an internal range sleeve 63, and a differential assembly 72. The barrel cam 59 can include a cam surface groove 57 for guiding the axial travel of the shift fork 68 in response to rotation of the barrel cam. The shift fork 68 can travel between axial positions corresponding to a high-range drive mode and low-range drive mode. The components of the clutch assembly 80 to be assembled can include a clutch actuator 88, a plurality of rolling members 92, an intermediate plate 78, a ring member 83, a pressure plate 84, a diaphragm spring 85, a clutch friction disc 86, a clutch housing 81, and a drive gear 82. As best illustrated in FIG. 6, assembling the range shifting assembly 60 and the clutch assembly 80 along the common primary axis of the input shaft 34 requires fewer off-axis components to actuate both the range shifting assembly 60 and the clutch assembly 80. The assembly of the transfer case 30 can also improve the operational efficiency of the range shifting assembly 60 and the clutch assembly 80.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. In a transfer case (30) including an input shaft (34) having a primary axis of rotation, a first output shaft (36) coaxially aligned with and rotatable about the primary axis, a second output shaft (38) rotatable about a secondary axis parallel to the primary axis, and a power transmission device (40) located between the first output shaft (36) and the second output shaft (38), the improvement comprising:
   a range shifting assembly (60) and a clutch assembly (80) located coaxial with respect to the primary axis and axially adjacent to one another, the range shifting assembly (60) operably connected between the input shaft (34) and the first output shaft (36) to axially shift between a low-range drive mode and a high-range drive mode, the clutch assembly (80) operably connected to the power transmission device (40) to axially move between an engaged position and a disengaged position to transfer into or out of a state creating driving continuity for transferring drive torque between the first output shaft (36) and the second output shaft (38); and
   an actuating device (32) including a rotatable concentric gear (48) mounted coaxial with respect to the primary axis and axially interposed between the range shifting assembly (60) and the clutch assembly (80), the concentric gear (48) actuating the range shifting assembly during a portion of angular rotation about the primary axis and actuating the clutch assembly (80) during a mutually exclusive portion of angular rotation about the primary axis.

2. The improvement of claim 1, wherein the actuating device (32) further comprises:
   a barrel cam (59) including a cam surface groove (57) and a plurality of cam tabs (58), the plurality of cam tabs (58) engageable with a corresponding plurality of elongated arcuate barrel-cam engaging slots (49) defined by the concentric gear (48);
   a plurality of springs (62) engageable between the barrel cam (59) and the concentric gear (48);
   a shift fork (68) for guided travel along the cam surface groove (57) of the barrel cam (59) in response to rotation of the barrel cam (59) by the concentric gear (48) to shift between the low-range drive mode and the high-range drive mode;
   a shift collar (70) operably engageable with the shift fork (68) to allow axial movement while restricting rotation of the shift fork (68); and
   an internal range sleeve (63) operably driven by the shift fork (68) in axial movement along the first output shaft (36) and connected for driving rotation of the first output shaft (36).

3. The improvement of claim 1, wherein the actuating device (32) further comprises:
   a clutch actuator (88) engageable with a face of the concentric gear (48) opposite from the range shifting assembly (60), the clutch actuator (88) including a plurality of clutch-actuating tabs (89) engageable with a corresponding plurality of elongated arcuate pocket slots (61) defined by the concentric gear (48), the clutch actuator (88) defining a plurality of elongated arcuate recesses (90) having a deep central portion tapering to a shallow depth at outer ends (94);
   a corresponding plurality of rolling members (92), a rolling member (92) received within each of the plurality of elongated arcuate recesses (90) for movement along the elongated arcuate recess (90) between a deeper central portion of the recess (90) and a shallower outer end (94) of the recess (90); and
   an axially movable intermediate plate (78) trapping the plurality of rolling members (92) interposed between the intermediate plate (78) and the clutch actuator (88), the intermediate plate (78) for shifting the clutch assembly (80) between a first axial clutch position and a second axial clutch position in response to movement of the rolling member from the deeper central portion of the recess (90) to the shallower outer end (94) of the recess (90).

4. The improvement of claim 3, wherein the intermediate plate (78) further comprises:
   a plurality of pins (96) on an exterior peripheral portion (98) of the intermediate plate (78) for allowing axial movement of the intermediate plate (78) with respect to the concentric gear (48) while preventing transfer of rotational movement from the concentric gear (48) to the intermediate plate (78) providing a free floating movement between the intermediate plate (78) and the concentric gear (48).

5. The improvement of claim 1, wherein the actuating device (32) further comprises:
an electric motor (44) located off axis with respect to the primary axis and a gear train (46) for driving the concentric gear (48) in rotation.

6. The improvement of claim 1 further comprising:
a differential assembly (72) operably engageable with range shifting assembly (60) for providing different drive ratios between the input shaft (34) and the output shafts (36, 38), the differential assembly (72) including a planetary gear assembly (74) having a plurality of planetary gears (102), a ring gear (104), a planetary gear carrier (106), and a sun gear (108), the sun gear (108) driven by the input shaft (34), and the first output shaft (36) selectively driven by one of the planetary gear carrier (106) and the sun gear (108) in response to actuation of the range shifting assembly (60).

7. The improvement of claim 1, wherein the clutch assembly (80) further comprises:
a drive gear (82) rotatable around the primary axis;
a pressure plate (84) mounted for rotation with the drive gear (82) and axially moveable with respect to the drive gear (82);
a clutch friction disc (86) mounted for rotation with and engageable with the pressure plate (84);
a diaphragm spring (85) mounted for rotation with and engageable between the pressure plate (84) and the clutch friction disc (86); and
a ring member (83) engageable between the actuating device (32) and the diaphragm spring (85).

8. A transfer case (30) comprising:
an input shaft (34) having a primary axis of rotation;
a first output shaft (36) aligned coaxially with respect to the input shaft (34) and rotatable about the primary axis;
a second output shaft (38) rotatable about a secondary axis parallel to the primary axis,
a range shifting assembly (60) operably connected between the input shaft (34) and the first output shaft (36) for shifting between a low-range drive mode and a high-range drive mode, the range shifting assembly (60) coaxial with respect to the primary axis;
a clutch assembly (80) coaxial with respect to the primary axis and located axially adjacent to the range shifting assembly (60), the clutch assembly (80) located between the first output shaft (36) and the second output shaft (38) to axially move between an engaged position and a disengaged position to transfer into or out of a state creating driving continuity for transferring drive torque between the first output shaft (36) and the second output shaft (38); and
an actuating device (32) including a rotatable concentric gear (48) coaxial with respect to the primary axis and located axially interposed between the range shifting assembly (60) and the clutch assembly (80) for rotation with respect to the primary axis, the concentric gear (48) actuating the range shifting assembly during a portion of angular rotation about the primary axis and actuating the clutch assembly (80) during a mutually exclusive portion of angular rotation about the primary axis.

9. The transfer case (30) of claim 8, wherein the actuating device further comprises:

a barrel cam (59) operably engageable with a first face of the concentric gear (48), the barrel cam (59) having a cam surface groove (57) and a plurality of cam tabs (58) engageable with a plurality of slots (49) defined by the concentric gear (48);
a plurality of springs (62) engageable between the barrel cam (59) and the concentric gear (48) for biasing the barrel cam (59) to follow rotation of the concentric gear (48) in either rotational direction; and
a shift fork (68) operably engageable with the cam surface groove (57) for guided axial movement in response to rotation of the barrel cam (59) driven by the concentric gear (48) for shifting between the low-range drive mode and the high-range drive mode.

10. The transfer case (30) of claim 9, wherein the actuating device (32) further comprises:
a shift collar (70) engageable with the shift fork (68) allowing axial movement of the shift fork (68) while restricting rotational movement of the shift fork (68) when driven by rotation of the barrel cam (59).

11. The transfer case (30) of claim 8, wherein the range shifting assembly (60) further comprises:
an internal range sleeve (63) operably driven in axial movement along the first output shaft (36) between a first axial position and a second axial position, the internal range sleeve (63) connected for driving rotation of the first output shaft (36); and
a differential assembly (72) operably engageable with the internal range sleeve (63) of the range shifting assembly (60) for providing different drive ratios between the input shaft (34) and the output shafts (36, 38), the differential assembly (72) including a planetary gear assembly (74) including a plurality of planetary gears (102), a ring gear (104), a planetary gear carrier (106), and a sun gear (108), the sun gear (108) driven by the input shaft (34), and the first output shaft (36) selectively driven by one of the planetary gear carrier (106) and the sun gear (108) depending on an axial position of the internal range sleeve (63) in response to actuation of the range shifting assembly (60) through rotation of the concentric gear (48).

12. The transfer case (30) of claim 8, wherein the actuating device (32) further comprises:
an electric motor (44) located off-axis with respect to the primary axis and operably engageable for driving the concentric gear (48) in rotation about the primary axis in either rotational direction.

13. The transfer case (30) of claim 8, wherein the clutch assembly (80) further comprises:
a clutch actuator (88) engageable with a second face of the concentric gear (48) opposite from the range shifting assembly (60), the clutch actuator (88) defining a plurality of elongated arcuate recess (90) having a deep central portion tapering to shallow outer ends (94);
a corresponding plurality of rolling members (92), one rolling member (92) received within each elongated arcuate recess (90) for axially shifting the clutch assembly (80) between a first clutch position and a second clutch position; and
an axially movable intermediate plate (78) trapping the plurality of rolling members (92) interposed between the intermediate plate (78) and the clutch actuator (88), the intermediate plate (78) including a plurality of outwardly projecting pins (96) on an exterior peripheral surface portion (98) of the intermediate plate (78) for providing a free floating guided relationship between the intermediate plate (78) and the concentric gear (48), the intermediate plate (78) for shifting the clutch assembly (80) between a first axial clutch position and a second axial clutch position as the rolling member moves between the deep central portion of the recess (90) and the shallow outer end (94) of the recess (90) in response to rotation of the concentric gear (48).

14. The transfer case (30) of claim 13, wherein the clutch assembly (80) further comprises:
   a drive gear (82) rotatable around the primary axis;
   a pressure plate (84) mounted for rotation with the drive gear (82) and axially moveable with respect to the drive gear (82);
   a clutch friction disc (86) mounted for rotation and engageable with the pressure plate (84);
   a diaphragm spring (85) mounted for rotation with and engageable between the pressure plate (84) and the clutch friction disc (86); and
   a ring member (83) engageable between the intermediate plate (78) and the diaphragm spring (85).

15. A method for assembling a transfer case (30) including an input shaft (34) having a primary axis of rotation, a first output shaft (36) coaxially aligned with and rotatable about the primary axis, a second output shaft (38) rotatable about a secondary axis parallel to the primary axis, and a power transmission device (40) located between the first output shaft (36) and the second output shaft (38), the method comprising:

positioning a range shifting assembly (60) and a clutch assembly (80) coaxial with respect to one another and axially adjacent to one another along the primary axis, the range shifting assembly (60) operably connected between the input shaft (34) and the first output shaft (36) to axially shift between a low-range drive mode and a high-range drive mode of operation, the clutch assembly (80) operably connected to the power transmission device (40) to axially move between an engaged position and a disengaged position to transfer into or out of a state creating driving continuity for transferring drive torque between the first output shaft (36) and the second output shaft (38); and interposing a concentric gear (48) of an actuating device (32) axially between the range shifting assembly (60) and the clutch assembly (80) for rotation with respect to the primary axis, the concentric gear (48) rotatable around the primary axis and operably engageable with the range shifting assembly (60) and the clutch assembly (80) for actuating the range shifting assembly during a portion of angular rotation about the primary axis and for actuating the clutch assembly (80) during a mutually exclusive portion of angular rotation about the primary axis.

* * * * *